United States Patent
Byer et al.

[11] Patent Number: 6,074,594
[45] Date of Patent: Jun. 13, 2000

[54] ELECTRIC FIELD DOMAIN PATTERNING

[75] Inventors: Robert L. Byer, Stanford; Martin M. Fejer, Palo Alto; Gregory D. Miller; Lawrence E. Myers, both of Stanford, all of Calif.

[73] Assignee: The Board of Trustees of the Leland Stanford Junior University, Palo Alto, Calif.

[21] Appl. No.: 09/110,677

[22] Filed: Jul. 7, 1998

Related U.S. Application Data

[62] Division of application No. 08/307,867, Sep. 16, 1994, Pat. No. 5,800,767.

[51] Int. Cl.$^7$ .............................. G01B 15/00; H05B 6/00
[52] U.S. Cl. ..................... 264/406; 264/40.1; 264/430
[58] Field of Search ............................. 264/406, 430, 264/435, 436, 40.1

[56] References Cited

U.S. PATENT DOCUMENTS

| | | | |
|---|---|---|---|
| 3,512,864 | 5/1970 | Haertling et al. | 264/1.21 |
| 3,761,746 | 9/1973 | Adler | 264/435 |
| 3,842,289 | 10/1974 | Yariv et al. | 307/88.3 |
| 3,970,959 | 7/1976 | Wang et al. | 331/95.5 C |
| 4,100,313 | 7/1978 | Hammer et al. | 427/162 |
| 4,236,785 | 12/1980 | Papuchon et al. | 350/96.14 |
| 4,382,978 | 5/1983 | Chen | 427/53.1 |
| 4,739,507 | 4/1988 | Byer et al. | 372/22 |
| 4,762,735 | 8/1988 | Gregoris et al. | 427/162 |
| 4,778,234 | 10/1988 | Papuchon et al. | 350/96.12 |
| 4,840,816 | 6/1989 | Appleton et al. | 427/38 |
| 4,856,006 | 8/1989 | Yano et al. | 472/22 |
| 4,865,406 | 9/1989 | Khanarian et al. | 350/96.12 |
| 4,886,587 | 12/1989 | Miyawaki | 204/130 |
| 5,121,250 | 6/1992 | Shinozaki et al. | 359/328 |
| 5,128,948 | 7/1992 | Papuchon et al. | 372/21 |
| 5,193,023 | 3/1993 | Yamada et al. | 359/245 |
| 5,475,526 | 12/1995 | Byer et al. | |
| 5,519,802 | 5/1996 | Field et al. | |
| 5,714,198 | 2/1998 | Byer et al. | |
| B1 5,036,220 | 7/1991 | Byer et al. | |

OTHER PUBLICATIONS

J. Webjorn, et al., "Quasi–phase–matched blue light generation in bulk lithium niobate,electrically pooled via periodic liquid electrodes," (May 26, 1994) Electronics Letters, vol. 30, No. 11, pp. 894–895.

Armstrong, J. A., et al., "Interactions between Light Waves in a Nonlinear Dielectric", Physical Review, vol. 127, No. 6, Sep. 15, 1962, pp. 1918–1939.

Dewey Jr., C. F., et al., "Enhanced nonlinear optical effects in rotationally twinned crystals", Applied Physics Letters, vol. 26, No. 8, Apr. 15, 1975, pp. 442–444.

Feisst, A., et al., "Current induced periodic ferroelectric domain structures in LiNbO$_3$ applied for efficient nonlinear optical frequency mixing", Applied Physics Letters, vol. 47, No. 11, Dec. 1, 1985, pp. 1125–1127.

Feng, D., et al., "Enhancement of second–harmonic generation in LiNbO$_3$ crystals with periodic laminar ferroelectric domains", Applied Physics Letters, vol. 37, No. 7, Oct. 1, 1980, pp. 607–609.

Jaskorzynska, B., et al., "Periodic structures for phase–matching in second harmonic generation in titanium lithium niobate waveguides", SPIE vol. 651 Integrated Optical Circuit Engineering III (1986), pp. 221–228.

(List continued on next page.)

*Primary Examiner*—Christopher A. Fiorilla
*Attorney, Agent, or Firm*—Flehr Hohbach Test Albritton & Herbert LLP

[57] ABSTRACT

A method of domain patterning a body of ferroelectric material in which the effects of the materials which interface with the body are selected to provide selected characteristics to the domain pattern.

1 Claim, 5 Drawing Sheets

OTHER PUBLICATIONS

Levine, B. F., et al., "Phase–matched second harmonic generation in a liquid–filled waveguide", Applied Physics Letters, vol. 26, No. 7, Apr. 1, 1975, pp. 375–377.

McMuller, J. D., "Optical parametric interactions in isotropic materials using a phase–corrected stack of nonlinear dielectric plates", Journal of Applied Physics, vol. 46, No. 7, Jul. 1975, pp. 3076–3081.

Miyazawa, S., "Ferroelectric domain inversion in Ti–diffused $LiNbO_3$ optical waveguide", Journal of Applied Physics, vol. 50, No. 7, Jul. 1979, pp. 4599–4603.

Nakamura, K., et al., "Poling of ferroelectric crystals by using interdigital electrodes and its application to bulk–wave tranducers", 1983 IEEE Ultrasonics Symposium, 4 pages.

Nakamura, K., et al., "Partial domain inversion in $LiNbO_3$ plates and its applications to piezoelectric devices", 1986 Ultrasonics Symposium, pp. 719–722.

Nazarathy, M., et al., "Spread–spectrum nonlinear–optical interactions: quasi–phase matching with pseudorandum polarity reversals", Optics Letters, vol. 12, No. 10, Oct. 1987, pp. 823–825.

Rustagi, K. C., et al., "Optical Frequency Conversion in Quasi–Phase–Matched Stacks of Nonlinear Crystals", IEEE Journal of Quantum Electronics, vol. QE–18, No. 6, Jun. 1982, pp. 1029–1041.

Somekh, S., et al., "Phase matching by periodic modulation of the nonlinear optical properties", Optics Communications, vol. 6, No. 3, Nov. 1972, pp. 301–304.

Stegeman, G. I., et al., "Nonlinear integrated optics", Journal of Applied Physics, vo. 58, No. 12, Dec. 15, 1985, pp. R57–R78.

Suchoski, P. G., et al., "Stable low–loss proton–exchanged $LiNbO_3$ waveguide devices with no electro–optic degradation", Optic Letters, vol. 13, No. 11, Nov. 1988, pp. 1050–1052.

Szilagyi, A., et al., "A quasi–phase–matching technique for efficient optical mixing and frequency doubling", Journal of Applied Physics, vol. 47, No. 5, May 1976, pp. 2025–2032.

Thaniyavarn, S., et al., "Domain inversion effects in Ti-L-$iNbO_3$ integrated optical devices", Applied Physics Letters, vol. 46, No. 10, May 15, 1985, pp. 933–935.

Tohmon, G., et al., "Blue Light Source Using Guided–Wave Frequency Doubler with a Diode Laser", SPIE vol. 898 Miniature Optics and Lasers (1988), pp. 70–75.

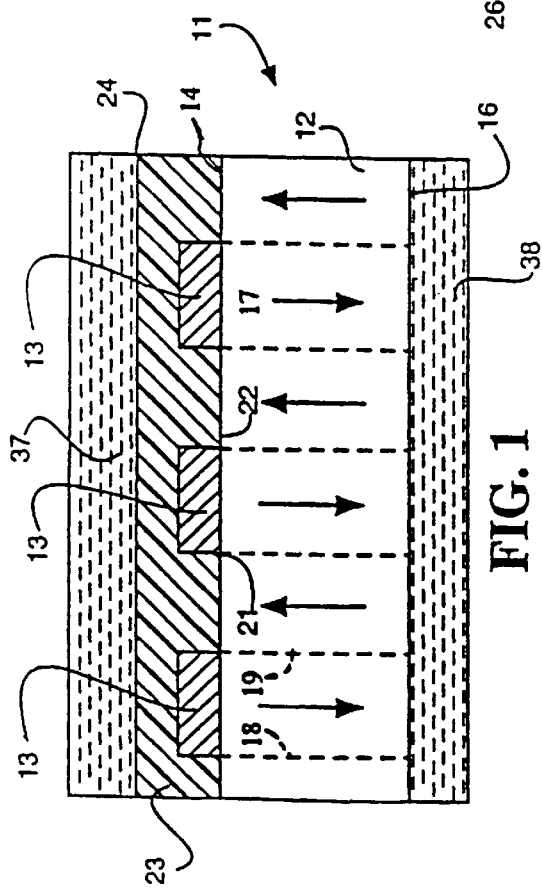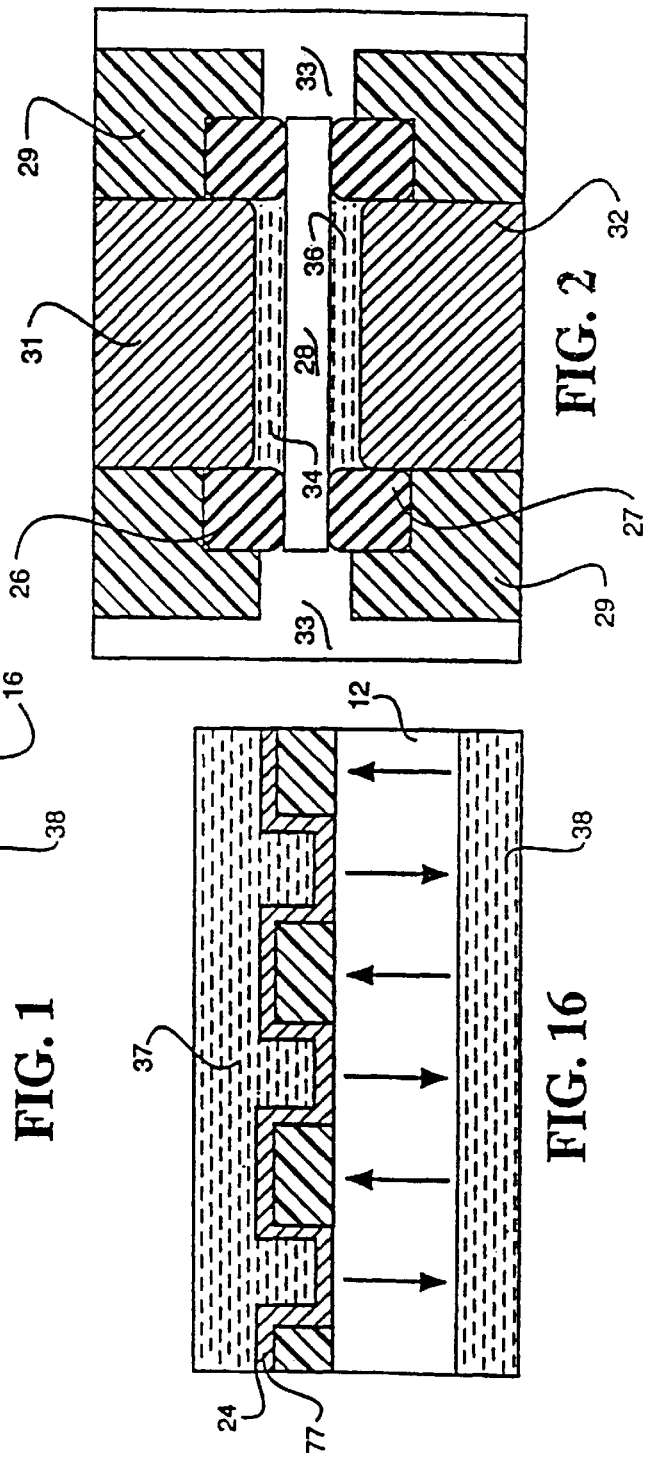

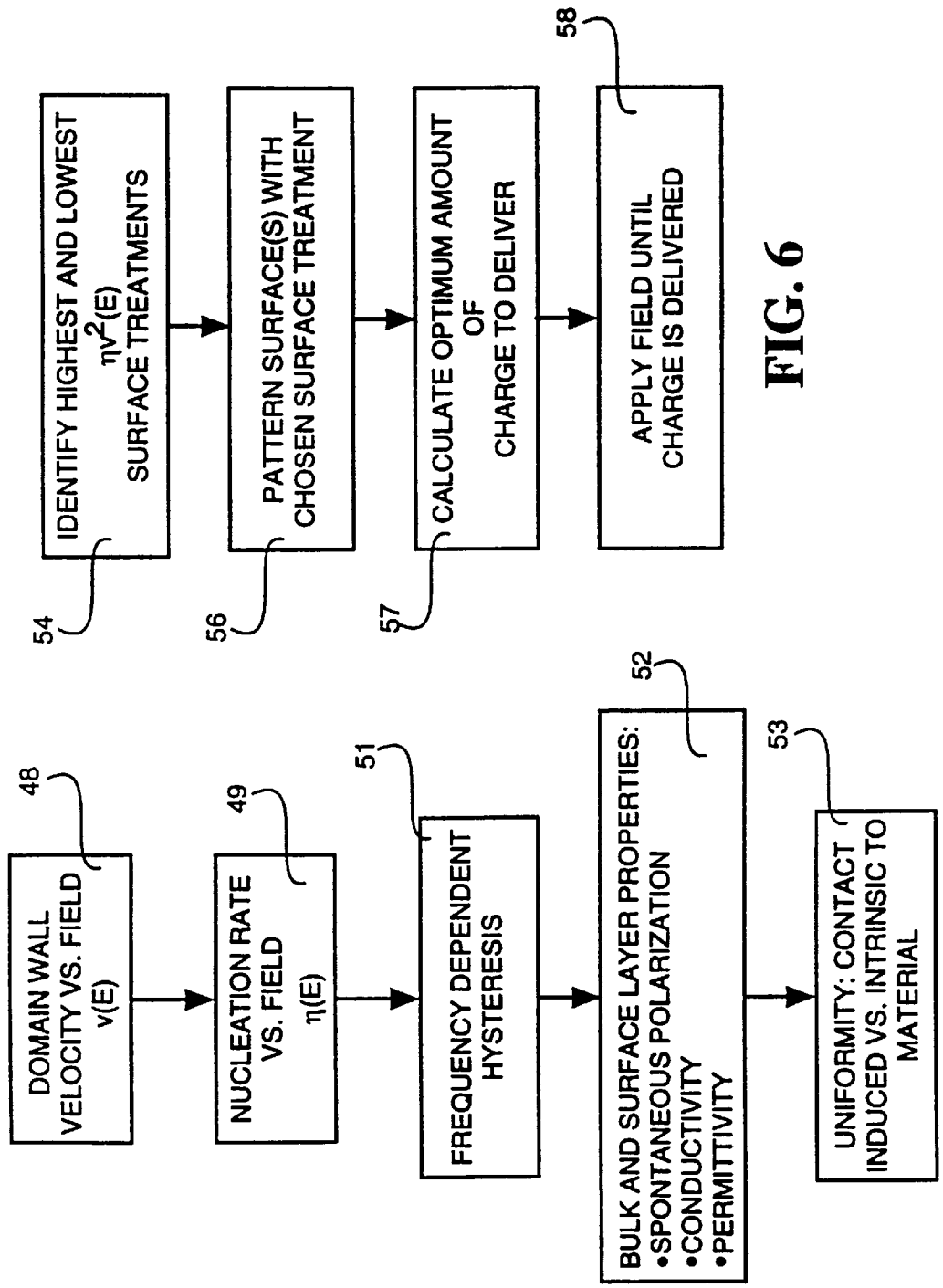

ELECTRIC FIELD DOMAIN PATTERNING

This is a division of application Ser. No. 08/307,867 filed Sep. 16, 1994 now U.S. Pat. No. 5,800,767, incorporated in its entirety by reference.

BACKGROUND OF THE INVENTION

The present invention relates to domain patterning and, more particularly, to domain patterning in ferroelectric materials via electric field poling.

Ferroelectric materials, by definition, have spontaneous polarization. That is, these materials have internal electric dipole moments. The direction of these moments can be controlled to form certain desired domain configurations within the ferroelectric. In this connection, much effort and research has been involved in developing structures having particular domain patterns. Reference is made, for example, to U.S. Pat. No. 5,036,220 issued Jul. 30, 1991 to Drs. Byer, Fejer and Lim relating to the creation of domain patterns within nonlinear materials for interaction with optical radiation to obtain frequency conversion via quasi-phasematching. (The term "optical" as used herein to identify EM radiation or EM radiation properties, is meant to define and encompass electromagnetic radiation in the visible wavelength spectrum and in other adjacent wavelength spectrums—typically radiation having a wavelength in the range of between 1 and 15,000 nanometers.) Much of this interest is due to the increasing possibility that frequency conversion via domain patterning will lead to quite reliable, inexpensive and small sources of desired radiation having adequate energy for its purposes. For example, much of the attention is devoted to generating "blue" optical radiation, i.e., radiation having a wavelength in the range of about 390–492 nm, to read compact discs.

One of the more significant approaches to domain patterning of a ferroelectric material, is the application of an electric field to the material to change the direction of spontaneous polarization in desired regions. This is commonly referred to as electric field poling. In this connection, ferroelectric materials are often sold in bulk form having spontaneous polarization in a single direction, e.g., the dominant spontaneous polarization extends throughout the material from one face to the opposite one. It is only necessary for quasi-phasematching with these materials to reverse the direction of the poling in specific regions. For most efficient quasi-phasematching, adjacent domains should have reversed directions of polarization with the width of each domain, i.e., the path therethrough of the expected optical radiation, being equal to one coherence length (preferably) or some other integer multiple of the coherence length through such material. (By "coherence length" is meant the distance over which the phase of the original optical radiation and the generated optical radiation slip by a factor of 180°. The paper authored by J. D. McMullen entitled "Optical Parametric Interactions in Isotropic Materials Using a Phase-Corrected Stack of Nonlinear Dielectric Plates" appearing in the *Journal of Applied Physics*, Vol. 46, No. 7 (July 1975) provides a mathematical definition and treatment of coherence length.)

A major problem with electric field poling is that it is somewhat difficult to provide a high resolution domain wall between adjacent domains, i.e., the shape and location of the boundary between adjacent domains typically cannot adequately be controlled for at least some applications.

SUMMARY OF THE INVENTION

It has been discovered that the electric fringe fields created in a body of ferroelectric material when it is subjected to electric field poling can profoundly interfere with the control of the location and character of the domain walls. Fringe field components are caused, for example, by the relative geometries of the ferroelectric body and the conducting strip or strips used for applying the poling field to such body. While the fringing electric field components associated with electric field poling approaches typically are ignored, it has been found that it is important to control the same in electric field poling to, in turn, control the shape and location of the domain walls.

A relatively simple and yet effective way of controlling the fringe field components (and minimizing their value) is to provide a potential surface adjacent (separate or touching) to the domain patterning conducting strips. This can be achieved by providing an insulating material in the spaces between the conducting strips to define the contour of a surface which can be maintained at a desired potential.

It has also been found that the selection of the materials used for poling can have a major effect on domain wall formation. For example, conductors of sputtered nickel in contact with a body of lithium niobate can cause domain wall formation at fields substantially below those required to form domains when using a sputtered molybdenum contact. Moreover, the domain wall velocity during poling can be controlled by selecting materials to contact the surface of the body having different impedances to the current which passes through such surface.

While improvements are obtained either when the fringe field components discussed above are taken into account or when the materials are appropriately selected with surface effects taken into consideration, best results are obtained when both of these techniques are used together.

The invention also includes a fixture which simplifies control of domain wall formation during poling. From the broad standpoint, such fixture comprise one or more holders to support a ferroelectric body or other sample, and at least one compliant electrode, preferably a liquid electrode, which will conform to the surface of the sample and be in direct contact therewith. Most desirably, the holders act as seals to prevent the electrode from flowing from the fixture.

Other features and advantages of the invention either will become apparent or will be described in connection with the following, more detailed description of preferred embodiments of the invention.

BRIEF DESCRIPTION OF THE DRAWING

With reference to the accompanying drawing:

FIG. 1 is an enlarged, highly schematic sectional view illustrating a domain patterning construction of the invention;

FIG. 2 is an enlarged, schematic view of a preferred embodiment of a fixture for applying an electric field to a sample;

FIGS. 3 through 6 are flow charts of a preferred embodiment of the method of the invention; and FIGS. 7 through 16 are views similar to FIG. 1 of alternative arrangements of the invention.

DETAILED DESCRIPTION OF PREFERRED EMBODIMENTS

Figure 4:
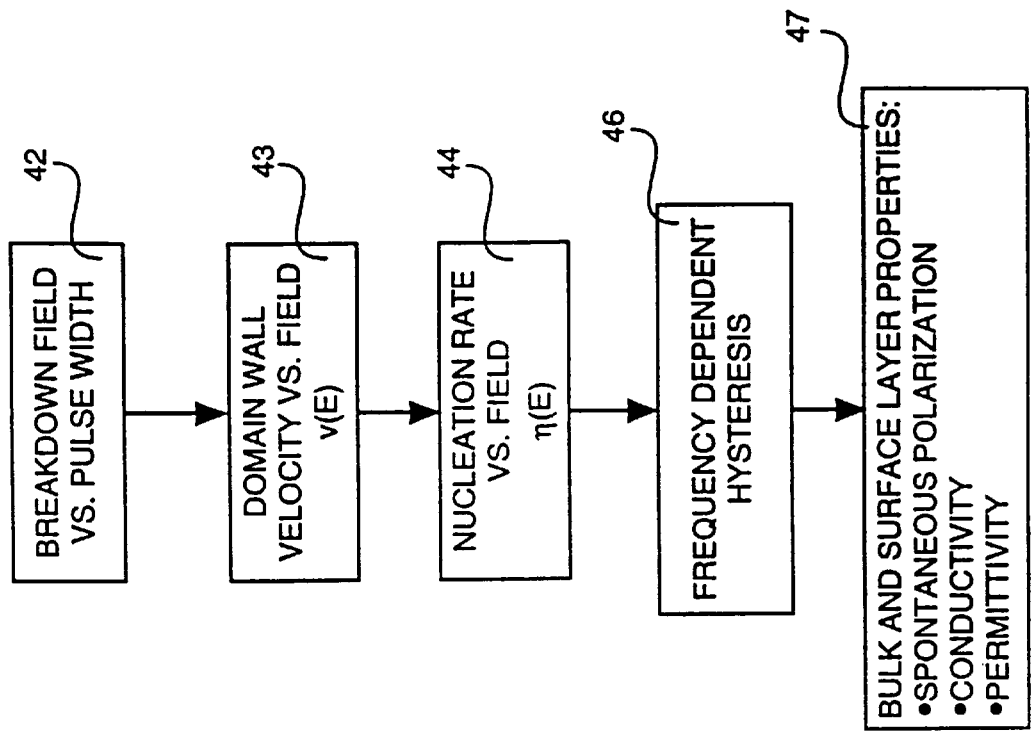

The following relatively detailed description is provided to satisfy the patent statutes. It will be appreciated by those skilled in the art, though, that various changes and modifications can be made without departing from the invention.

FIG. 1 is a highly enlarged and diagrammatic sectional view from which the present invention can be understood. A domain patterning construction for a body 12 of ferroelectric material is generally referred to in such figure by the reference numeral 11. The body 12 could be, for example, lithium niobate (LiNbO$_3$), although the method of the invention is applicable to other ferroelectric materials, such as MGO:LiNbO$_2$ or LiTAO$_3$.

An electrode pattern is made up in this embodiment of a plurality of equally spaced, similar electrode conducting strips 13, although other patterns may require differing strips and spaces therebetween. The electrode pattern represented by such strips is applied to surface 14 of the body by an approach which will result in them being in intimate contact with such surface, e.g., by lithography. The body is selected to have a dominant spontaneous polarization in a single direction, e.g., from face 16 (the −z crystalline face) to the +z face 14. (It will be recognized that the invention is not limited to such orthogonality, the crystal axis may be at any angle to such surfaces.)

The portion of the construction 11 described to this point is conventional. It is already known how to provide an electrical field in a body of a ferroelectric material with such an arrangement. A pulsed or steady-state voltage is applied across the body with use of the electrodes 13 and an electrode on the surface 16. A signal is selected which will cause sufficient change in the body to reverse the dominant spontaneous polarization in those regions of the body beneath the electrodes, i.e., in the regions 17. Each of such regions will be separated from adjacent regions in the body by domain walls 18 and 19. In a conventional arrangement, the shape and location these domain walls is relatively uncontrollable. That is, rather than there being a planar demarcation between the regions, the walls 18 and 19 will be convoluted and the positions at which such walls are formed is not adequately controllable. This interferes with use of the poled body. For example, this lack of spatial resolution of the walls interferes with quasi-phasematching. In this connection, for efficient quasi-phasematching the full length of each of the domain regions should be an integer (for most efficiency the integer should be one) multiple of the coherence length in the body of the optical radiation whose frequency is to be converted. When the frequencies are quite high, it is important that the walls' shape and location be highly resolved.

As brought out in the summary, it has been found that the fringe electric field components created during electric field poling can deleteriously affect control of the location and character of the domain walls. While in most electric field poling approaches the fringe components are ignored, it has been found that they cannot be ignored if high spatial resolution domain walls are desired. These fringe components are created by the geometry of the strips 13 relative to the geometry of body 12. In the arrangement being described, the sharp corners 21 and 22 of each of the conducting strips will produce field fringe components in the body 12. In keeping with the invention, a potential is created generally adjacent the surface 14 to control such fringe components. A surface for such potential is simply provided by the provision of an insulating layer 23 covering the surface 14 (It is to be noted that this insulating layer 23 contacts the surface 14 of the body 12 at those locations not contacted by the strips 13, and by an insulating layer is meant a layer of material which is electrically insulative relative to the electrodes.) Such layer 23 defines a surface 24 for a conductive covering. A potential is then applied to the conductive covering at the same time a potential is applied to the electrodes 13. It has been found that the fringe electric field components provided by such electrodes can be controlled by such a potential—it is adjacent the regions in the body which have (or otherwise would have if not eliminated) the fringe components. In the particular arrangement being described, the same voltage is applied the surface 24 as that applied to the electrodes 13. It will be recognized that in any arrangement the potential at the surface defined by the insulating layer will depend upon the potential applied to the electrodes and surface 16 which may, in fact, be different voltages.

The presence of a thin insulator (whose outermost surface is held at a uniform potential) over the metal lines serves to reduce the magnitude of the fringe fields relative to the case of an infinitely thick insulator (air in most cases). When one has an infinitely thick insulator, the fringe fields vary in magnitude almost uncontrollably, resulting at times in damage to the surface of the sample-as well as reduced domain shape control. In addition, when attempting to pattern the domains in increasingly thicker samples, one finds that the infinite thickness insulator case results in an upper bound on the maximum sample thickness, since the maximum fringe field magnitude is proportional to the voltage applied, which is in turn proportional to the sample thickness. By adjusting the thickness of the insulating layer for the voltage required to pole the sample, one can reduce the peak fringe field magnitude to safe levels where breakdown can be avoided and domain pattern quality can be optimized.

In most situations, it is desirable to minimize the fringe components of the field. It also has been found that depending upon the thickness and the arrangement of the electrodes, the insulating layer 23, the applied voltages, etc., the fringe fields formed in the body by rectangular electrodes, such as electrode 13, can be minimized to the point where they are eliminated.

Reference is made to FIG. 2 for a better understanding of the manner and structure by which the electric field is applied to a "sample" (a construction made up of a body 12, conducting electrode strips 13 and an insulator material or layer 23). A pair of holders 26 and 27 maintain the sample, represented at 28, in place. These holders can be simply O-rings made of a fluoroelastomer, such as the O-rings sold with the trademark "Viton". As shown, the O-rings are embedded within a suitable impermeable and insulative housing 29. Housing 29 can be made of, for example, an insulating thermoplastic such as that sold with the trademark "Delrin". A pair of conductive electrodes 31 and 32 are within the housing to introduce the potential and current which is to be applied to the sample. Such electrodes can be made of any suitable conductive material, such as brass. The entire construction is surrounded by a silicone oil as represented at 33. It also could be, for example, a hydrocarbon oil, air, low conductivity liquid, or potting compounds, depending on field parameters (i.e., duration and magnitude). It will be noted that the construction is such that oil 33 is in contact with the ends of the sample and prevents the flow of leakage current and the onset of corona.

The electrodes 31 and 32 do not directly deliver the potential to the sample 28. Rather, a conducting liquid, such as an electrolyte, fills pockets 34 and 36 to bridge the gaps between the respective electrodes 31 and 32 and the sample 28. One purpose of the electrolyte is to assure that the electrode in contact with the sample conforms completely to the surface of such sample. In this connection, it is best that it be a low surface tension electrolyte, such as an isopropanol-based one. The conductivity of the electrolyte can be selected to conform with the width of the pulses that create the electric field.

It should be noted that the holders 26 and 27 have several different functions. For one, they act as dams to prevent the liquid electrolyte from flowing from the fixture. Moreover, the interface of the electrolyte and the O-rings aids in domain wall patterning. That is, prior to introducing oil and the sample, the regions 34 and 36 are filled with the electrolyte or some other liquid of suitable conductivity. Then the sample is introduced and the O-rings are brought into contact. However, the O-rings trap a thin film of the conductive liquid, and at their point of departure from the surface of the sample, the liquid is gradually reduced in thickness. The wet-contact of the O-ring then provides a taper in the thickness of the contacting liquid to a very thin region. This taper and the ultimate thickness of the thin liquid layer between the O-ring and the sample results in a gradual reduction of the potential seen by the surface of the sample in the vicinity of the O-ring/sample interface. The gradual reduction of potential prevents the formation of intensified fringe fields which can themselves lead to domain reversal or, worse yet, dielectric breakdown.

It is important to consider domain wall formation at this contact perimeter because domain walls formed there may grow to a point where they overcome the effects of the patterning strategies chosen. It is possible with this method to completely suppress domain wall formation at the contact perimeter. Moreover, dry contact may be appropriate for certain poling conditions/materials/patterns.

It also should be noted that from the broad standpoint it is not necessary that the electrode(s) which engages the sample be liquid. It is desirable, though, that they be compliant to conform to the surface and provide intimate contact therewith. Moreover, also from the broad standpoint, the fixture can be designed to provide the compliant contact on only one side of the sample.

The electrolyte is represented in FIG. 1 at 37 and 38, and it will be seen that the interface between the electrolyte 37 and the insulating layer 23 provides potential surface 24. It is most simply at the same potential relative to the electrolyte 38, as the electrodes.

It is to be noted that fringe fields can be: useful in initiating domain reversal, since the ferroelectric domain reversal will first occur in the regions of highest field magnitude. (Actually, the dot product of the spontaneous polarization vector and electric field vector is the quantity of concern.) The domains formed along the edges of the conductors then see a reduced field magnitude in the regions between them compared to the fields under the conductors. Consequently, they broaden much more slowly away from the conductor than they do under the conductor, resulting in a patterned domain structure closely resembling the metallized pattern on the surface.

Figure 3:
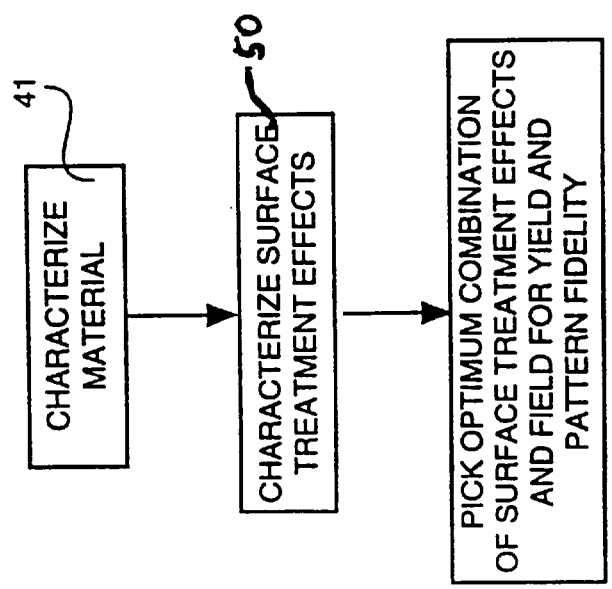

As discussed to this point, the focus has been on the control of fringe fields. It also has been found that the effect on the desired patterning of the surface interaction between the body and materials which interface with such surface during the patterning should be taken into consideration for best results. In fact, materials which will contact the surface during patterning can be selected to provide desired effects. FIG. 3 is a high level flow chart showing a general overview of developing a recipe for domain patterning, whereas FIGS. 4 through 6 are flow charts which show the details of each block of the flow chart of FIG. 3.

With reference to FIG. 3, to develop the appropriate recipe for a domain patterning of a particular body of material, it is necessary to characterize such material. This is represented in FIG. 3 by block 41. When beginning the characterization of the material, one would first benefit by identifying a safe operating envelope for that material. That is, by first measuring the breakdown field as a function of pulse width (FIG. 4, block 42), one then knows the safe fields and pulse durations that can be applied during poling. Care must be taken to ensure during this measurement that the location of breakdown on the sample is not in the vicinity of the contact perimeter, as this is indicative of fringe-field induced breakdown resulting from the electrical contact rather than an intrinsic material parameter. To this end, the contacting fixture shown in FIG. 2 is most helpful.

One should also determine the domain wall velocity as a function of electric field strength (FIG. 4, block 43). One may obtain this information by applying a known field for a known amount of time to a sample and then observing the domains with techniques appropriate to the ferroelectric under study. For example, the domains of lithium niobate can readily be observed after a five minute room temperature etching 50% hydrofluoric acid. The domain radii are measured with the aid of a microscope and divided by the pulse width. This procedure is repeated for various field strengths and plotted graphically.

While obtaining domain wall velocity data, one should also measure nucleation statistics, especially the nucleation rate, for each field condition (FIG. 4, block 44). Nucleation rate is simply the number of domains formed per unit area per unit time.

The body to be patterned will also have hysteresis when pulses are applied thereto. This hysteresis will be, of course, frequency dependent. The hysteresis of the body relative to several candidate frequencies also should be determined. Such determination is represented in FIG. 4 by block 46. Other various bulk and surface layer properties should also be characterized. The spontaneous polarization in the body should be measured, the body's conductivity and its permittivity also should be checked. Box 47 in the flow chart of FIG. 4 represents such characterization. These properties are helpful in identifying pulse-width dependent phenomena and for selecting optimum poling conditions.

After having characterized the ferroelectric material itself, one then should characterize various possible surface treatments. Metals, oxides, deposition techniques, polymers such as photoresist and polyamide, surface preparation, chemical modification, etc., are all candidates for consideration. It is worthwhile even to consider the effect of various gases (including air) on the ferroelectric properties of the material. While an extensive list of surface treatments to apply to ferroelectrics may be unreasonable to consider, those familiar with a particular ferroelectric will be able to narrow the list substantially.

Referring to FIG. 5, one again measures the ferroelectric properties for the surface treatments chosen. Typically surface treatments do not in themselves lead to a change in breakdown characteristics, but can have a profound effect on domain wall velocity (block 48), nucleation rate (block 49), and hysteresis (block 51). In addition, the properties of the ferroelectric may be changed in the vicinity of the surface treatment block 52. Some surface treatments such as annealing can also lead to changes in the bulk properties. Finally, due to the nature of material surfaces and techniques of applying surface treatments, one should discern that the treatment is uniformly applied (Block 53) and, if not, whether the non-uniformity is due to the interface where the surface treatment contacts the material or if it is due to the nature of the material itself.

Taken together, the product of the nucleation rate and square of the velocity for a given surface treatment (as well as untreated material) yield a quantity that is proportional to the rate at which the surface of interest is poled. The product $\eta v^2(E)$ for each surface treatment considered then acts as a figure of merit whereby one may select the optimum combination of surface treatments for domain patterning (FIG. 6, block 54).

By identifying the surface treatments with the most extreme values of $\eta v^2(E)$, one then has identified the optimum surface treatments for domain patterning and the field to be used in poling. Then (FIG. 6, block 56) one applies the surface treatment pattern desired. From the spontaneous polarization and conductivity data, the optimum charge for the desired pattern is calculated (FIG. 6, block 57). The sample is then loaded into the contacting fixture (FIG. 2) and the field maximizing the difference in $\eta v^2(E)$ for the surface treatments is applied (FIG. 6, block 58) until the calculated charge is delivered to the sample.

This procedure will then result in the desired domain pattern. In some ferroelectrics, the domain pattern may require that the field be reduced, not to zero, but to some value below the coercive field and held for a time characteristic of the material in order for the domains to become stable. This information is obtained from the frequency dependent hysteresis data. For example, lithium niobate requires up to 50 ms at 18 KV/mm to permit the domains to stabilize, compared to a poling field of 21.5 KV/mm. An additional consideration in establishing poling waveforms (i.e., field strength vs time) is that in some ferroelectrics, domain walls of domains in close proximity to one another may be drawn together or apart from one another as the domains broaden, during poling. This is observable while obtaining nucleation statistics from opposite faces of the same sample. This can be avoided by poling at fields where the domain wall velocity is relatively insensitive to changes in field. Since domain wall velocity in ferroelectrics saturates at high poling fields, one should be sure to characterize the material and surface treatments in this regime. This effect increases in significance as sample size is increased and pattern feature size is decreased.

It can be shown that as ferroelectric domain walls propagate through the material, a current enters the domain wall at the surface of the sample. This current produces a voltage drop in the medium in contact with the surface at the domain wall and in turn lowers the electric field at the surface. The impedance seen by the domain wall then has an effect on the domain wall velocity. Thus, it will be appreciated that by patterning the impedance at the surface of the domain wall, one is able to control the formation of domain patterns by surface conductivity modulation. For example, if one were to pattern equal thickness alternating stripes of manganese ($\sigma=139$ $\mu\Omega$-cm) and silver ($\sigma=1.61$ $\mu\Omega$-cm) separated by thin insulating stripes, the domain wall would see an 80-fold variation in impedance. Furthermore, the thickness of the two metals could be varied to increase this contrast ratio even more.

With conductivity modulation of the above type, essentially no fringe fields exist with fields applied below the coercive field. It is only after a domain is formed and its walls begin to propagate that fringe fields are formed. The fringe fields produced during domain wall motion act to restrict domain formation to the regions of low impedance. Thus, this approach is especially attractive on thick materials, where fringe fields of but a few percent above the coercive field can result in dielectric breakdown.

In the case where the coercive field of the material is patterned into the surface, the application of a uniform external field results in a uniform field in the surface. The patterning with this technique results in regions which are either easier or harder to domain-reverse, depending on the surface treatment. For external fields whose values are between the minimum and maximum coercive fields, one can then pattern the domain structure.

Rather than applying a modulated electric field (either voltage induced as in the case of fringe-field-assisted patterning or current induced as in the case of conductivity modulation as discussed above) or a coercive field patterning, a field pattern can be built into the surface 14 of the material. In the case where a field pattern is built into the surface of the material, the application of a uniform external field results in a modulated field pattern at the surface, since the two fields combine linearly. The built-in field pattern can then be thought of as a biasing field pattern. Biasing may be achieved by applying materials on the surface of the sample which, by their very presence, establish a built-in field. One mechanism by which one may build-in a field is based on the well-known Schottky effect. For example, evaporated aluminum has the ability to initiate domain reversal when patterned onto the +z face and the ability to inhibit domain reversal when patterned onto the −z face. Domain reversal inhibition can be used to fabricate a domain structure suitable for a nonlinear waveguide on the −z face of lithium niobate using an aluminum electrode pattern.

Built-in surface field and coercive field patterning techniques are grouped together since they are achieved by similar means and both may be used with a uniform external field, even during domain wall motion. Many materials which build in a field may also change the coercive field at the surface. However, for clarity the effects are discussed separately.

It is well known that the contact between materials often results in a transition in chemistry between one material and the other. This transition in chemistry can have associated with it built-in electric fields. By appropriate choice of the material patterned onto the surface of the ferroelectric, one can then build in a patterned electric field which can be used in the same way as the Schottky potential discussed above to pattern the domain structure of the ferroelectric.

By altering the chemical composition of the surface of the ferroelectric one can build in a surface potential, as discussed above. However, one can also change the coercive field at the surface by changing the chemical composition there. Methods for modifying the surface chemistry to a significant depth include indiffusion, outdiffusion, and exchange. Patterning the surface chemistry aids in achieving a desired bulk domain pattern.

Under conditions of slow domain wall velocities (determined by the dielectric relaxation time of the insulator), the insulator's DC resistivity is important, since domain wall motion under the insulator requires current which in turn produces a voltage drop in the insulator, slowing the domain wall velocity. This characteristic can be used to produce features of large spatial periodicity with slow velocity. Under conditions of fast domain wall velocity, where domain walls may be straighter in some materials, the insulator's permittivity is important, since the domain wall obtains current by displacement charge flow through the insulator. Here, a thin insulating layer, needed for fringe-field-assisted domain patterning of thick samples, could result in reduced pattern quality. The permittivity of the insulating layer is then tied to the maximum sample thickness for a given feature size.

Aluminum is one of several appropriate materials for the conducting strips when the body 12 is lithium niobate. While the strips could be applied by an evaporative technique, it has been found that best results are achieved when the electrode pattern is applied by sputtering. (It is conjectured that a more intimate bond with the surface 14 is provided by sputtering.)

An optimum combination of effects should be sought for the particular ferroelectric chosen.

EXAMPLE

The processing starts with a z-cut congruent LiNbO$_3$ wafer which is a standard product of commercial suppliers. A conductive grating electrode is applied to the +z surface 14 of the crystal in a typical procedure of the invention. A conventional lift-off lithography process for creating this patterned electrode uses the following steps: spin photoresist on the +z surface, expose with UV light through a mask with the desired electrode pattern, develop the exposed photoresist, evaporate metal onto the +z surface, and remove the remaining photoresist to leave a patterned metal region. The grating pattern should extend beyond the desired device dimensions.

Next, a layer of a photoresist is applied over the electrode pattern. This layer insulates the conductor strip, inhibits domain formation between the grating lines, and forms the contour of the covering potential surface. A suitable layer can be formed by spinning the photoresist over the entire +z surface, removing unwanted resist by exposing to UV light through a contact lithography mask, and then developing. The size of the remaining photoresist region should match the desired device dimensions, so that the grating electrode extends beyond the photoresist region. Electrical contact is made to the exposed edge of the grating pattern as described in the next paragraph. The completed photoresist layer is hard baked to improve durability in further processing.

The LiNbO$_3$ piece is then placed in an electrical circuit containing a voltage source, and electrical contact is made to the +z and −z surfaces through electrodes 31,32 and electrolyte 37,38 within pockets 34 and 36. The positive side of the voltage source is connected to the +z surface and the negative side to the −z surface, so that the resulting field causes reversal of the ferroelectric domains. The electrolyte contact allows application of high voltages to the sample without problems of corona and dielectric breakdown at the outer edges of the electrode or around the sample. It has been demonstrated experimentally that sufficient force can be applied to the O-rings 26 and 27 to effect sealing of the electrolyte in the presence of the applied electric field without damaging a 0.5 mm-thick LiNbO$_3$ crystal. The sample is connected to the circuit by allowing the electrolyte to cover the portion of the grating pattern not covered by the photoresist layer on the +z face, and by direct contact of the electrolyte to the −z surface. Sufficient space is left between the end of the electrode pattern and the O-ring seal so that the metal pattern does not extend under the O-ring where dielectric breakdown might occur due to high fringing fields at the sharp edges.

The electrolyte covers the photoresist layer on the +z surface, such that the electrolyte/photoresist interface forms the surface 14 as an isopotential one. As mentioned previously, this isopotential surface serves the important function of controlling the fringing fields at the edges of the conducting strips. These fringing fields limit the uniformity and resolution of the domain pattern that is actually created in the sample. The nearby isopotential surface reduces the magnitude of these fringing fields, making it possible to achieve greater fidelity in the resulting domain pattern for a given electrode pattern.

The final step in the process is the application of the electric field. The values of voltage, current, and poling time depend on the actual circuit used; however, an electric field strength of approximately 21 kV/mm should be applied across the sample in order for significant domain reversal to occur. A series resistor placed in the circuit helps regulate the current flow through the sample. If no external series resistor is used, the impedance of the source or other circuit elements should be considered. A simple expression for selecting circuit parameters has been experimentally shown to be valid over the current range 10 $\mu$A to 10 mA using a corresponding series resistance from 100M$\Omega$ to 100 k$\Omega$. For a series resistor $R_s$ and a driving voltage $V_1$, the current through the sample is given by $I \approx (V_1 - V_c)/R_s$, where $V_c$, is the coercive voltage for the given sample thickness needed to reach a field strength of 21 kV/mm. The poling time t is linearly related to the surface area of the domain reversed region A by $t = 2P_s A/I$, where $P_s$ is the spontaneous polarization of the material ($P_s = 0.71 C/m_2$ (literature) or $0.78 C/m_2$ (measured) for LiNbO$_3$).

Reversal occurs preferentially under the metal strips because of higher field strength there, relative to the photoresist-covered regions between the metal strips, and reversal-enhancing surface interaction at the metal/LiNbO$_3$ interface. Reversal occurs last in the region where photoresist directly contacts the +z surface, because the applied field strength there is lower and because of possible reversal-inhibiting interactions at the insulator/LiNbO$_3$ interface. Reversal under the photoresist has a higher coercive voltage, so it does not occur while the rest of the poling is taking place except for a slight widening of the electrode pattern due to fringing fields. Therefore, the poling process can be terminated before poling under the photoresist starts. In order to relax the timing requirement for terminating the poling, the area under the liquid between the photoresist and the seal should be large enough that poling will still be occurring there when the poling under the metal pattern has completed. It has been found that making the area of this region one to two times the area of the domain-reversed region under the patterned electrode gives good results. This buffer area can be reduced if poling can be slowed down in this region, perhaps by applying a thin dielectric layer or otherwise using a material interface to modulate the poling rate there. An alternative is to reduce the applied voltage such that the driving field is below the coercive field for the photoresist-covered region.

Several samples were made in accordance with the above. Each was 0.5 mm thick. The electrode pattern on each of these samples was created with lift-off lithography. The electrode material was 2000 Å-thick evaporated aluminum, and the electrode pattern Extended 200 $\mu$m beyond the desired device dimensions. The electrode pattern was a grating with duty cycle adjusted to allow for the outward growth of the pattern due to fringing fields; patterns with a 15.5 $\mu$m period having 3.5 $\mu$m lines and patterns with a 31 $\mu$m period having 11.5 $\mu$m lines were used in order to produce domain gratings with 50/50 duty cycle. As an insulating layer, a 2 $\mu$m thick photoresist layer was formed with an acrylic based photoresist, such as Shipley S1400 photoresist, which was hard-baked at 120° C. for 30 min after patterning. The liquid electrolyte was a solution of LiCl in deionized water (80 ml granulated LiCl in 200 ml of deionized water). The high voltage supply was a high voltage amplifier (Trek 20/20) driven by a function generator (Stanford Research Systems SRS DS345). Voltage on the sample was monitored with a resistive voltage divider (1000:1, 1 $\Omega$ impedance), and current through the sample was monitored with a 500 Ω resistor in the ground return. The series resistor was 100 MΩ and the driving voltage of the high voltage amplifier was 12 kV. The current was +15 μA and the poling times were 0.36 sec and 1.9 sec for devices with 2.2 mm and 5.2 mm interaction lengths, respectively. These samples made with this process had excellent pattern uniformity over the entire interaction length and were used to make nonlinear optical devices.

Figure 7:
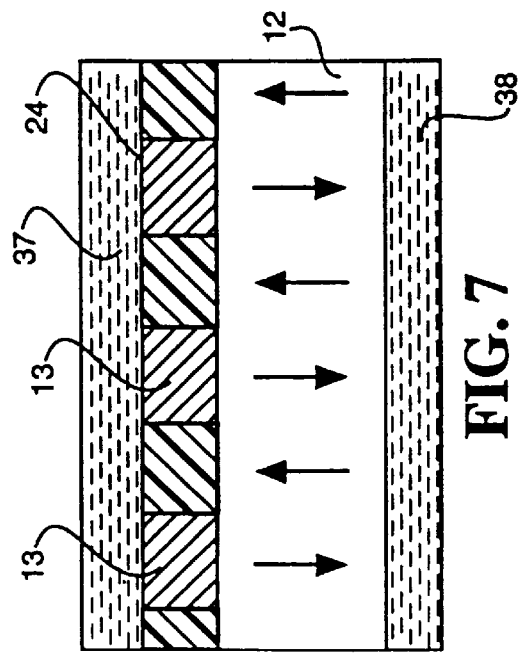

FIGS. 7 through 15 show several alternate arrangements incorporating the invention. FIG. 7 is similar to FIG. 1 except that the conducting strips 13 extend upward to the surface 24. This type of arrangement easily can be made when the electrolyte 37 is at the same potential as the conducting strips 13. Those skilled in the art will recognize that such an arrangement will work.

Figure 8:
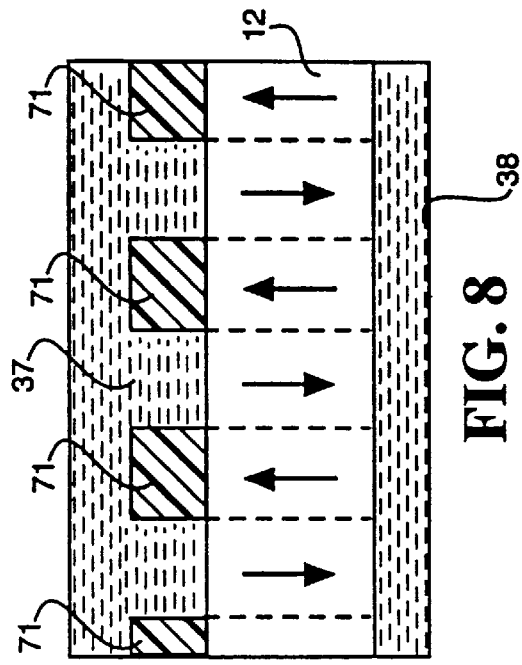

The purpose of including FIG. 7 is simply to make it very clear that the arrangement shown in FIG. 8 also is an embodiment of the invention. Since the electrolyte is at the same potential as the conducting strips, the latter can be replaced by such electrolyte as indicated in FIG. 8. In this sort of arrangement, the insulator is in discrete portions 71 separating the space between the conducting strips, now provided by the electrolyte 37. The surface 24 is all of that portion of the surface interface between the insulator and the electrolyte.

Figure 9:
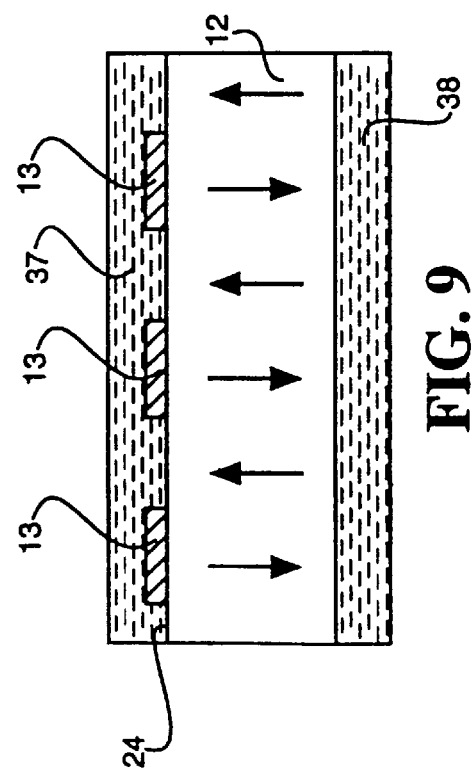

FIG. 9 is an embodiment which does not include the insulator but only the conducting strips. The potential surface 24 has merged with surface 14. The configuration ,* of this embodiment is particularly suited to strategies employing coercive field modulation, conductivity modulation (with the liquid as the second conductor), built-in field modulation, and contact density modulation.

Figure 10:
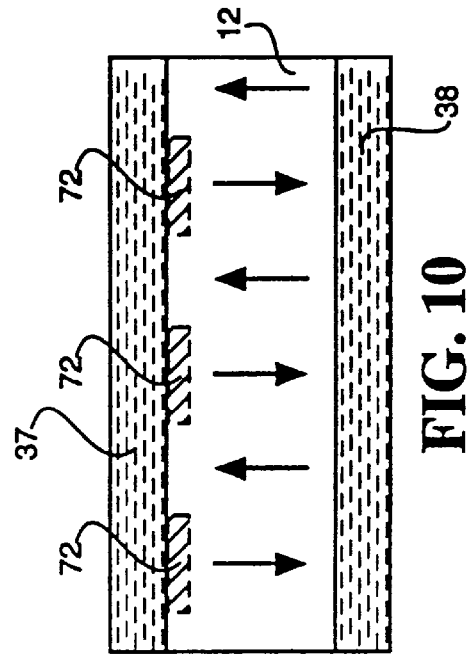
Figure 11:
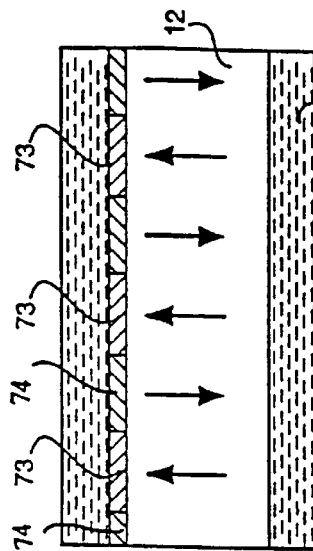

FIG. 10 illustrates a configuration in which the conducting strips which form the pattern are replaced by modified substrate materials. That is, the body 12 is selectively modified as represented at 72 to provide modulated material properties, for example, domain wall velocity differential between those areas which are modified and those which are not modified. This,; modification can be, for example, ion exchange, crystalline damage, titanium indiffusion, etc. FIG. 11 shows another configuration not having an insulator. Rather, the body 12 is itself contoured. Again, the potential surface 24 and the surface 14 are merged. They follow the contour of the body 12.

Figure 12:
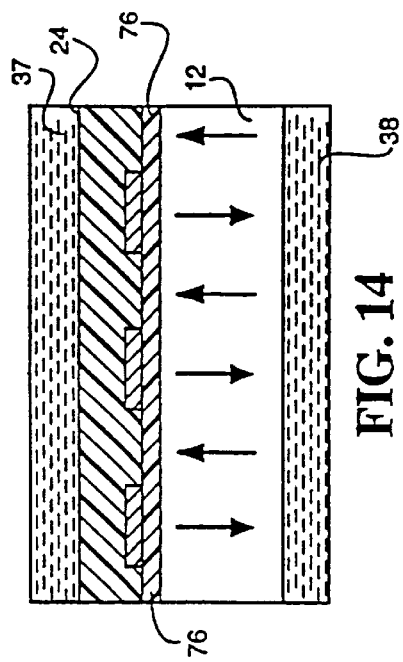

FIG. 12 is illustrative of an arrangement in which two differing conductors are provided adjacent one another, rather than conductor/insulator. That is, with reference to such figure it is seen that the surface 14 has two different conducting strips 73 and 74 adhered thereto. (In the case of conductivity modulation, they are, of course, insulated from one another by, for example, the formation of surface oxides.) The materials of the electrodes are selected to cause different domain wall velocities in the body 12. They might be, for example, sputtered nickel and sputtered molybdenum.

Figure 13:
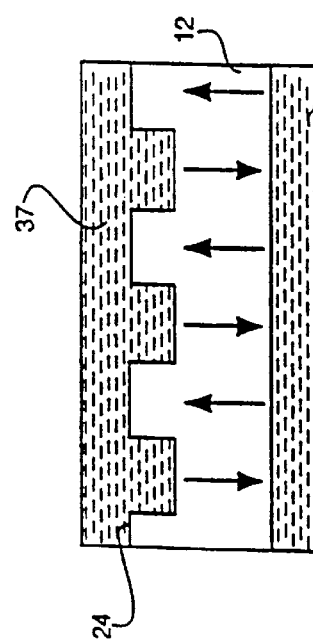
Figure 14:
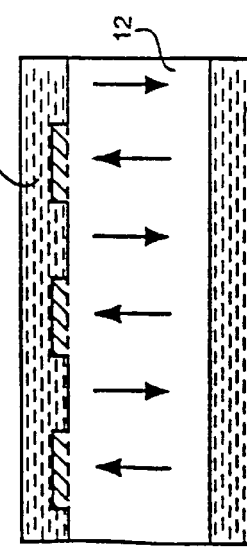
Figure 15:
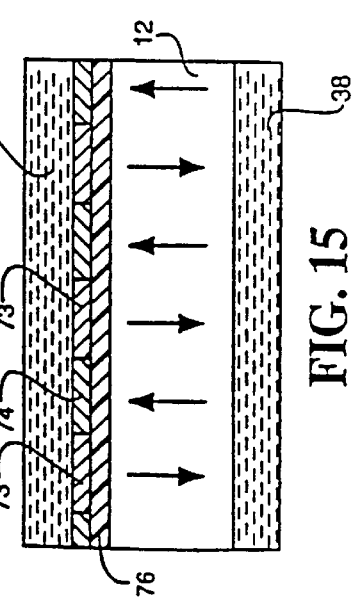

FIG. 13 shows an arrangement in which the surface layer of the body is modified and the selected portions are removed to allow the electrolyte to flow therein and be the electrodes. FIG. 14 is similar to FIG. 1 except that it includes an additional insulating layer 76 between the body 12 and conducting strips 13/insulator 23. The use of such an insulator between the body to be poled and the conducting strips defining the domain pattern is described in Yamada et al. U.S. Pat. No. 5,193,023. Such an arrangement is particularly useful with applicants' construction since the fringe fields will be spaced from and attenuated by, the extra insulating layer. The embodiment of FIG. 15 is similar to FIG. 12, except for the extra insulating layer 76. It is included to show that the use of such an insulator with domain wall patterning by adjacent, disparate conducting strips is also contemplated.

FIG. 16 represents a configuration utilizing several features of the invention. The body 12 is patterned with an insulator as in the embodiment of FIG. 8 and a metal conducting layer 77 is applied to it. This conducting layer has several functions. For one, this layer provides for enhanced domain formation by reason of the surface contact effects discussed previously with respect to FIG. 9. In addition, it acts as an impermeable seal at what otherwise would be the electrolyte/body interface. The portions of the conductor which are in contact with the insulator, act to inhibit fringe fields.

The following is a specific example of an arrangement consistent with FIG. 16 by which one may produce 3.5 μm–3.75 μm wide domains on a 15.5 μm period through the volume of a half-mm thick piece of z-cut congruent lithium niobate.

EXAMPLE

First, one spins a coating of photoresist onto the +z face of a quarter wafer of half-mm thick optical grade z-cut lithium niobate and pre-bakes it in an oven at 90° C. for one-half hour. Upon removal from the oven, the sample is permitted to cool slowly in still air for at least 15 minutes. (Lithium niobate is pyroelectric and can, if cooled with sufficient rapidity, develop a potential on its surfaces capable of producing unwanted domain reversal.) The photoresist is then exposed through a mask of suitable features in a contact mask aligner. Care must be taken to avoid irradiation of the masked features from reflection off the mask aligner's wafer chuck, as this will affect the ultimate pattern fidelity. The quarter wafer is then developed and hard baked for one-half hour at 115–120° C. Again, upon removal from the hard-bake oven, the sample should be allowed to cool slowly to room temperature in still air. Temperatures in excess of 120° C. will result in some rounding of features which will affect the fringe fields.

The quarter wafer then should be plasma etched in order to remove all organic contaminants from the exposed surface between the photoresist features just prior to metallization. The metallization step consists of evaporating 1000 Å of chrome over the photoresist pattern. The quarter wafer is then cut according to the dimensions required for the implementation of the fixture shown in FIG. 2.

The fixture is then filled with a solution of 70% isopropanol/30% deionized water, and the sample is installed. This particular liquid is chosen to minimize the risk of dissolving the photoresist in the event of pinholes in the chromium, a common occurrence with evaporated metals. Isopropanol is mixed with water to improve the wettability of the liquid to both ensure a bubble-free contact and that the film formed in the interface between the O-rings and the sample would sufficiently eliminate fringe fields at the contact perimeter. However, isopropanol alone attacks photoresist. This particular mixture was found to leave the photoresist intact while providing improved wettability. The fixture is tightened, forming a seal with the O-rings. The solution is then flushed with straight isopropanol, and the isopropanol is displaced with silicone oil. (Silicone oil has a higher specific gravity than isopropanol.)

The sample is connected to a circuit which applies four 20 μs 13 KV pulses spaced 5 minutes apart, with the anode contacting the +z face of the sample. In one implementation, the circuit had a rise time of 100 ns and it had a series diode which blocked the flow of reverse current. This diode is important, because the domains of lithium niobate are unstable for about 50 ms after they are formed, and if current is permitted to flow backward through the sample, the domains that form will be erased.

The sample is then removed for inspection. After the chrome and photoresist are removed, the sample should be etched lightly for 5 minutes in room temperature concentrated hydrofluoric acid (50%) to reveal the domain boundaries on the +z and −z faces. The sample can then be polished on one of its y-faces and again lightly etched to reveal the domain structure throughout its volume. In an implementation, it was clear that this method resulted in less than 1/8 $\mu$m of domain growth under the photoresist.

Further improvements on this method also can be made. Sputtered nickel has been shown to result in a substantial lowering of the coercive field (by as much as 2 KV/mm) over that of unmetallized lithium niobate. In addition, sputtering results in better photoresist sidewall coverage and improved overall electrical contact, compared to evaporating. Other insulating layers with greater surface adhesion and superior electrical properties to photoresist, e.g., polyimide and hafnium oxide can result in further enhancement. As such, this method, and variants of it, have been useful in patterning 1 $\mu$m domains in lithium niobate.

As mentioned at the beginning of the detailed description, applicants are not limited to the specific embodiments described above. Most of such embodiments are particularly designed for domain patterning of optical nonlinear materials. The invention is applicable to domain patterning for uses other than nonlinear optical interactions (e.g., electro-optical, acoustic wave, etc.) Portions of this invention have uses other than domain patterning (e.g., the use of the fixture shown in FIG. 2 to characterize dielectrics). The claims, their equivalents and their equivalent language define the scope of protection.

What is claimed is:

1. In a method of domain patterning a body of a ferroelectric material in which spaced strip of conductive material are directly, or indirectly through an interface material, couple to the surface of the body for applying an electric field to the body to form the patterned domains, the steps of characterizing the properties of the ferroelectric material by measuring the breakdown as a function of applied electrical pulse width, determining the domain wall velocity as a function of electric field strength by applying a known electric for a determined time, while determining the domain wall velocity obtaining the nucleation rate, determining the hysteresis as a function of frequency, measuring bulk and surface layer properties including spontaneous polarization, conductivity and permitivity characterizing effects of various surface treatments by characterizing the properties of the treated ferroelectric material by the same steps as those used to characterize the ferroelectric material and determining whether the surface treatment is uniform, identifying the surface treatments with the most extreme values of the product of nucleation rate and the square of velocity, applying the desired pattern of the identified surface treatments, determining from the spontaneous polarization and conductivity data the optimum charge for the desired pattern, and applying a field which provides the optimum charge.

* * * * *